C. GIBBS & J. SOKOLOV.
STENCILING MACHINE.
APPLICATION FILED APR. 6, 1909.

1,046,581.

Patented Dec. 10, 1912.

WITNESSES
John O. Seifert
John C. Kopf

INVENTORS
Charles Gibbs and Jacob Sokolov
By B. C. Stickney
ATTORNEY

C. GIBBS & J. SOKOLOV.
STENCILING MACHINE.
APPLICATION FILED APR. 6, 1909.

1,046,581.

Patented Dec. 10, 1912.
6 SHEETS—SHEET 5.

WITNESSES
John O. Seifert
John C. Kopp

INVENTORS
Charles Gibbs & Jacob Sokolov
By B. C. Stickney
ATTORNEY

UNITED STATES PATENT OFFICE.

CHARLES GIBBS AND JACOB SOKOLOV, OF NEW YORK, N. Y., ASSIGNORS TO UNDERWOOD TYPEWRITER COMPANY, OF NEW YORK, N. Y., A CORPORATION OF NEW JERSEY.

STENCILING-MACHINE.

1,046,581.     Specification of Letters Patent.     Patented Dec. 10, 1912.

Application filed April 6, 1909. Serial No. 488,226.

*To all whom it may concern:*

Be it known that we, CHARLES GIBBS, a citizen of the United States, residing in the borough of Bronx, city, county, and State of New York, and JACOB SOKOLOV, a subject of the Czar of Russia, residing in the borough of Brooklyn, city of New York, county of Kings, and State of New York, have invented certain new and useful Improvements in Stenciling-Machines, of which the following is a specification.

This invention relates generally to feeding devices, particularly those for feeding sheets to stenciling or printing machines, and more especially to machines in which sheets are simultaneously fed from two piles, one sheet going through the bite of the stencil cylinder and pressure roll, and the other sheet advancing to overlie the previously delivered stenciled sheet, to prevent offset. In this class of machines the pile of sheets to be stenciled upon is placed upon one feed board, and the pile of interleaving sheets is placed upon another feed board beneath the first, a duplex mechanism advancing a sheet from each pile at each revolution of the stencil cylinder. The duplex sheet-advancing mechanism comprises a roll running upon each of the two piles of sheets, said rolls connected to a single carriage, and the latter connected to the stencil cylinder, whereby the carriage and roll are caused to travel back and forth at every revolution of the cylinder. The interleaving sheets are fed between the rolls of an auxiliary pair, and advance forwardly below the stencil cylinder and its pressure roll.

One of the main objects of the present invention is to provide improved and simplified means for separating a sheet from a pile and advancing it to the printing or other mechanism. To this end a clip or pair of clips are employed to rest upon the leading end of a pile of sheets, and the top sheet is withdrawn from the clips, and then advanced thereover to the printing mechanism. The withdrawal of the top sheet is effected by a feeding device, shown in the form of a roll, which travels forwardly and backwardly upon the pile of sheets. In the first part of its retreating movement it runs freely over the pile, but during the last part of such movement it grips the top sheet and pulls it out from the yielding clips, and buckles the rear portion of the sheet against a gage or stop; the rear end of the pile of sheets being held down by a pressure bar. During the following advance travel of the roll, it continues to grip the sheet and carries it forwardly over the clips, which are beveled and thinned to facilitate the movement of the sheet over them. This sheet-feeding device is substantially duplicated for the interleaving pile of sheets, the rolls being connected to a single carriage, which in turn is connected to the stencil cylinder. Means are provided for conveniently elevating the clips to release the pile of sheets, or facilitate inserting a new pile into the machine.

The roller carriage is connected by a pitman to a crank, a train of gearing connecting the crank to the stencil cylinder; and all of the gears, as well as the crank and pitman, are confined between a pair of side plates, which are united to form the framework of the machine; thereby effecting an improvement in the appearance of the machine and simplifying the construction and operation of the parts as well as giving them protection. One member of the train of gearing is fixed to the stencil cylinder, and is conveniently detachable with the latter. The stencil cylinder is preferably power-driven, by means of a motor which is connected to a member of the train of gearing, so that the stencil cylinder may be detached without disturbing the motor or other source of power. The advancing rolls for the interleaving sheets include a driving roll which is geared to said train of gearing. Other features and advantages will hereinafter appear.

In the accompanying drawings.

Figures 11, 12:
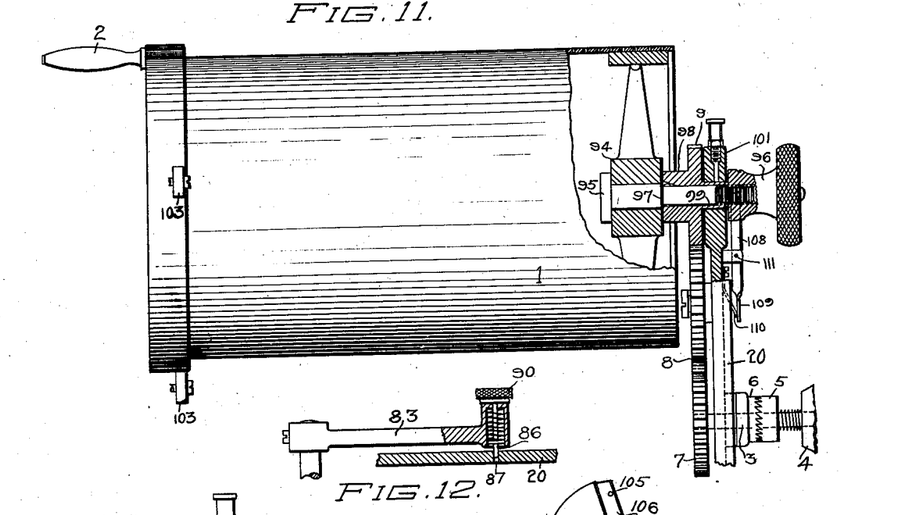
Fig. 11 is a front elevation partly in section of the stencil cylinder and gearing.
Fig. 12 is a part sectional plan of a releasing arm for the clips which hold the forward edge of the lower pile of sheets; showing the pin whereby the arm and clips are held released.

The stencil cylinder 1 is of the usual type, and may be rotated either by a handle 2, Fig. 11, or a power shaft 3, by means of a motor 4, the latter being connected by a spring ratchet 5 to a ratchet collar 6 on the power shaft, to permit the stencil cylinder to be advanced while the motor is not running. It will be observed that a driving gear 7 is connected by an idle gear 8 with a gear 9, the latter rigid with the stencil cylinder. A pressure roll 10 running upon the bottom of the cylinder 1 presses the sheets against the cylinder to be stenciled.

At 11 is seen a pile of sheets to be stenciled, said sheets resting upon a stationary table 12 and advanced one by one to the bite of the cylinder and pressure roll by means of a feeding roll 13. Said roll 13 is connected to a carriage or traveler comprising a pair of sliding blocks 14 and a connecting shaft 15, one of said blocks connected by a pitman 16 to a crank 17 fixed upon a revolving shaft 18. The carriage is run back and forth in guide-ways 19 formed in the vertical side plates 20, which are joined by said table 12 and a lower table 21 to form the framework of the machine. Each end of the shaft 15 carries a gear 22 to mesh with a rack 23 fixed to the under side of the table 12, whereby the blocks 14 are caused to travel in unison, and liability of binding is avoided. It will be noted that said revolving shaft 18, which extends horizontally across the machine, is provided at one end with a gear 24 meshing with the drive gear 7; the gear 24 being of the same diameter as the gear 9, so that the roller carriage (comprising the blocks 14 and the shaft 15) is given one complete reciprocation along the guides 19 at each revolution of the stencil cylinder 1. Said feeding roll 13 is carried upon a bail comprising a pair of arms 25 and a cross arm or shaft 26, which is hinged to a pair of arms 27 erected upon the blocks 14. The bail loosely connects the roll to the carriage, to enable the roll to rise or fall to accommodate the height of the pile of sheets.

Figure 1:
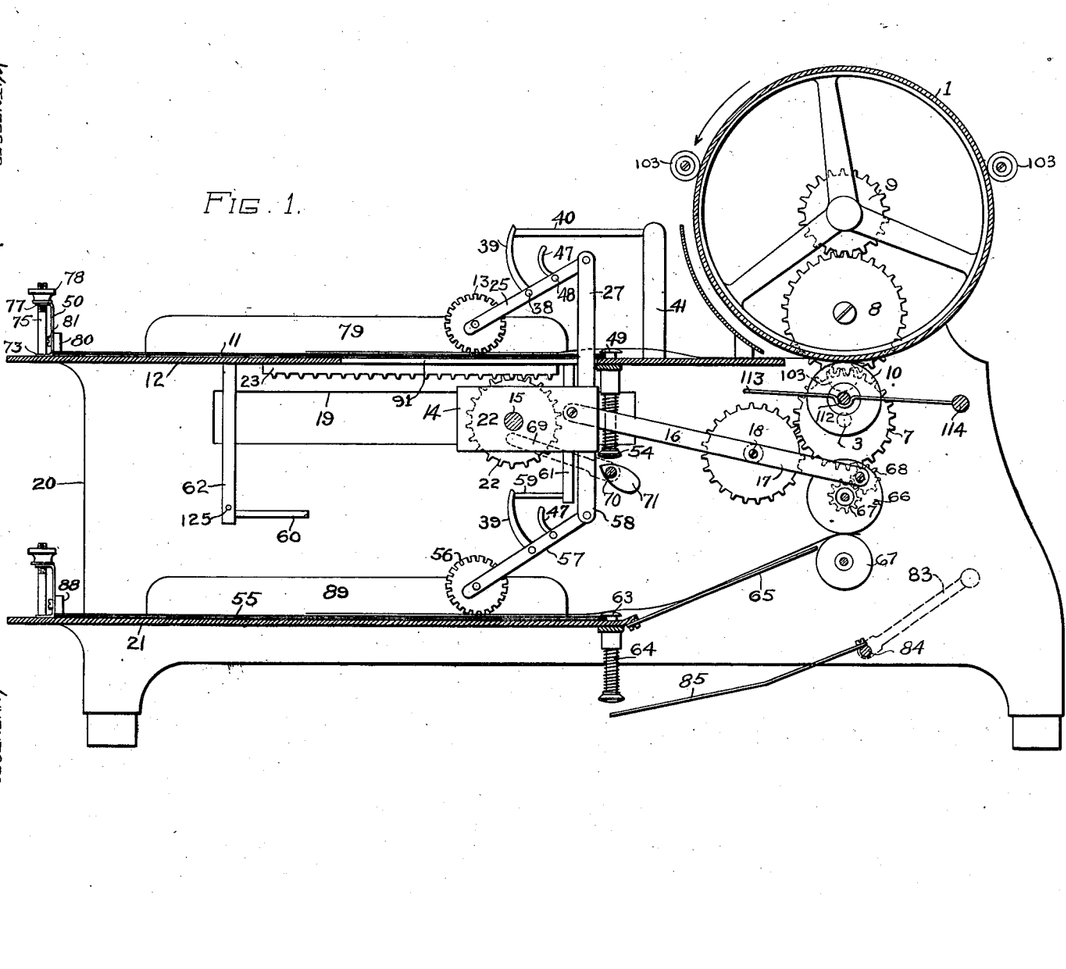
Figure 1 is a sectional side elevation of a stencil and interleaving machine constructed in accordance with the present improvements; one sheet being shown as advanced to the bite of the stencil cylinder and pressure roll, and another sheet as advanced to the bite of a pair of rolls, which feed it forwardly beneath the first sheet.

During the entire advance travel of the feeding roll 13 forwardly to the Fig. 1 position, said roll is held against rotation, to grip and advance the top sheet. A ball 28 is constantly pressed by a spring 29 into the bite of an abutment 30 and a collar or wheel 31, the latter fixed upon the roll shaft 32 between the two sections into which the roll is shown divided. The abutment and the adjoining surface of the wheel 31 form a narrowing throat in which the ball fits tightly; rotation of the wheel, in a direction to carry the ball farther into the throat, being of course prevented by the ball itself. This ball has no tendency to prevent the wheel and roll from rotating when the latter is traveling backwardly from the Fig. 1 position. The described ball clutch holds the roll 13 against turning for the purpose of enabling the roll to grip and advance the top sheet of the pile 11 during the entire advance stroke of the roll.

The tendency of the roll 13 to revolve during its retreating stroke is controlled by clutch mechanism, which is constructed to permit the roll to run freely for only part of the distance. This clutch mechanism comprises a ball 33 and a spring 34, which tends constantly to push the ball up into the bite of the wheel 31 and an abutment 35, provided upon the same arm 36 which carries the abutment 30 and forms part of the roller carrying frame.

Figures 2, 3, 4:
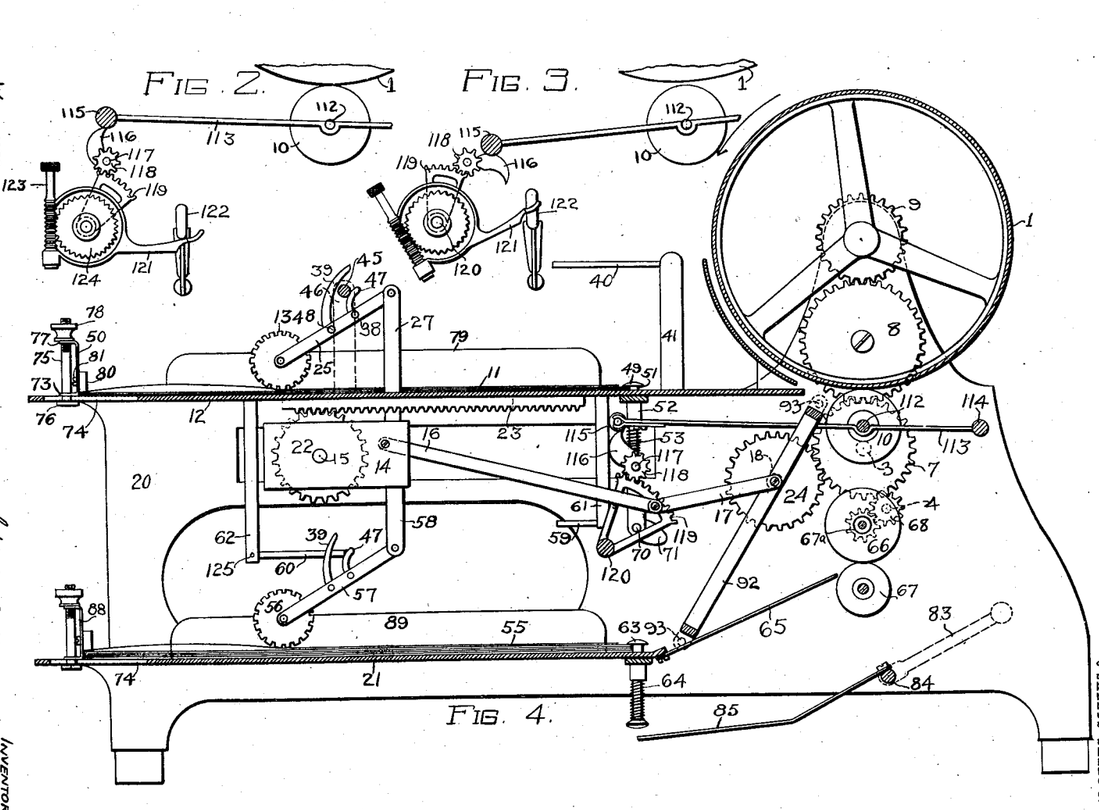
Fig. 2 is a detail in elevation of the mechanism which controls the adjustment and releasing of the main pressure roll, which bears against the stencil cylinder at Figs. 1 and 4; the parts at Fig. 2 being shown in normal positions.
Fig. 3 is a view similar to Fig. 2, but showing the parts in position to release the pressure roll.
Fig. 4 is a view similar to Fig. 1, but showing the top sheet withdrawn from the clips and buckling against the rear paper gage.

It will be seen at Fig. 8 that both balls are below the axis about which the roll 13 turns and that ball 28 is capable of preventing rotation of the roller 13 in one direction, while ball 33 is capable of preventing reverse rotation of the roller 13. To release the ball clutch 33 and thereby permit rotation of the roller 13 in the direction shown by the arrow at Fig. 7, an arm 37 is provided to engage said ball, and push it down against the tension of the spring 34, so as to release the wheel 31. Said arm 37 is fixed upon a rock shaft 38 journaled at one end in the bar 36, and at the other end in a bar 25 and carrying a tappet arm 39, in the path of which is a fixed projection or stop 40 supported upon a standard 41 erected upon the table 12. As the roller carriage approaches the position at Fig. 1, said tappet arm 39 is arrested by the stop 40, and a further movement of the roller carriage causes the rotation of the shaft 38 to turn the arm 37 and drive down the ball 33, so that the roller 13 is freed, and may turn as it starts on its retreating stroke. A latch or sear 42 is pressed down by a spring 43 behind a jog or shoulder 44 formed on the arm 37, to hold the latter temporarily in clutch releasing position. Thus the roller 13 runs freely and idly back over the pile of sheets, until a projection or stop 45 (fixed upon a standard 46 also erected on the table 12) engages an arm 47 which is secured to a rock shaft 48 carrying said sear 42 and mounted in the bars 36, 25. The arm 47 being arrested, continued backward movement of the roll frame causes the rock shaft 48 to lift the sear 42 to release the arm 37, whereupon the spring 34 again presses the ball 33 up to lock the roller 13 against further rotation. As soon as the clutch ball 33 again becomes effective as just set forth, the roller 13 grips the top sheet and pulls it back from the control of a pair of clips 49, and buckles it against a rear gage 50, as at Fig. 4. The roller carriage at this point is at the terminal portion of its retreating stroke; and during its advance stroke the non-rotating roller 13 grips and carries forwardly the released sheet, as at Fig. 1, to the bite of the roll 10 and stencil cylinder 1, the clips 49 being made thin and beveled to facilitate the advance of the sheet thereover. The release of the arm 37 from the sear 42 occurs early enough to permit the roller 13 to withdraw the top sheet from the clips 49 before completing its retreating stroke. Thus it will be seen that as the stencil cylinder revolves, the roller carriage travels to and fro, and at every operation releases the top sheet from the clips, buckles it back against the gage 50 and then carries it forward to be stenciled. The roller frame falls as the pile of sheets diminishes, and the described movements are repeated until the last sheet of the pile is fed.

Each of the clips 49 is in the form of a head provided upon the top of a vertical pin 51, which is guided for up and down movement in the boss 52 provided on the bottom of the table 12. A compression spring 53 is coiled around the lower end of the pin between a head 54 and the boss 52. This spring tends constantly to hold the clip lightly down upon the pile of sheets; and the provision of two independent clips, one at each side of the forward edge of the pile, insures that the pressure shall be uniform at both points on the sheets.

Figure 7:
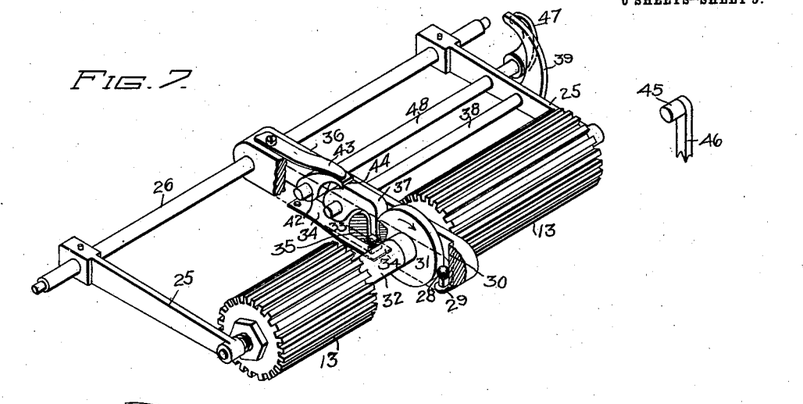
Fig. 7 is a perspective view of a feed roller and the devices for controlling it. At this figure, the roll is shown released to permit it to run backwardly freely from the Fig. 1 position.

The interleaving sheets are placed in a pile 55 upon the lower table 21, and are fed forward in the same manner as the sheets in the pile 11, by means of a feeding roll 56 similar to 13 and supported on a frame 57 similar to the frame seen at Fig. 7, and hinged upon arms 58 depending from the carriage blocks 14. The roll 56, like 13, is made of soft rubber and corrugated, and its movements are controlled by ball clutches, corresponding in all respects to those above described. A stop 59 engages the clutch-releasing arm 39 of the lower frame, Fig. 1, and a stop 60 engages the sear-releasing arm 47; said stops fixed upon hangers 61 and 62 depending from the table 12. Clips 63 rest upon the forward edge of the lower pile 55; these clips being similar to 49, and held down by a spring 64. The interleaving sheets are fed forwardly up an inclined leaf 65 to the bite of a pair of advancing rolls 66, 67, whereby they are fed forwardly to drop beneath the stencil sheets or to alternate therewith. The shaft of the roll 66 carries a pinion 67$^a$ which is connected by a pinion 68 to the main driving gear 7.

Figures 13, 14, 15, 16:
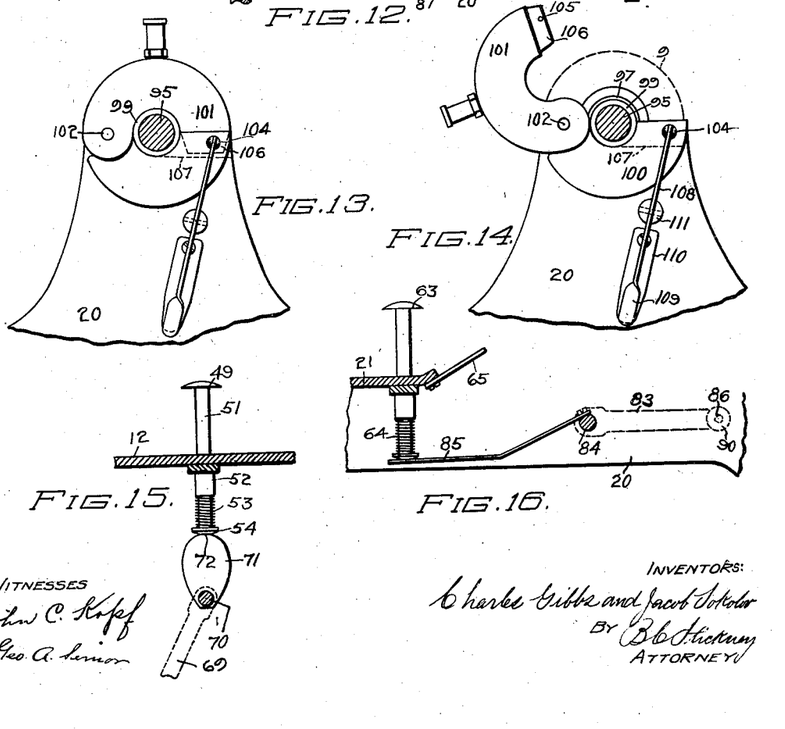
Fig. 13 shows the bearing of the stencil cylinder.
Fig. 14 shows the same opened to release the cylinder.
Fig. 15 illustrates the method of releasing the clips that hold the upper pile.
Fig. 16 shows the manner of releasing the clips that hold the lower pile of sheets.

When it is desired to operate the machine, a lever 69, Fig. 1, is depressed to rock a shaft 70, which carries a pair of cams 71, which turn up and engage the heads 54 to lift the clips 49; said cams constructed with dwell portions 72 to maintain the clips mechanically elevated, as at Fig. 15. The sheets are then laid upon the table 12, and the rear gage 50 is set forwardly to confine the sheets snugly between said gage and the stems on which the clips 49 are formed.

Figure 5:
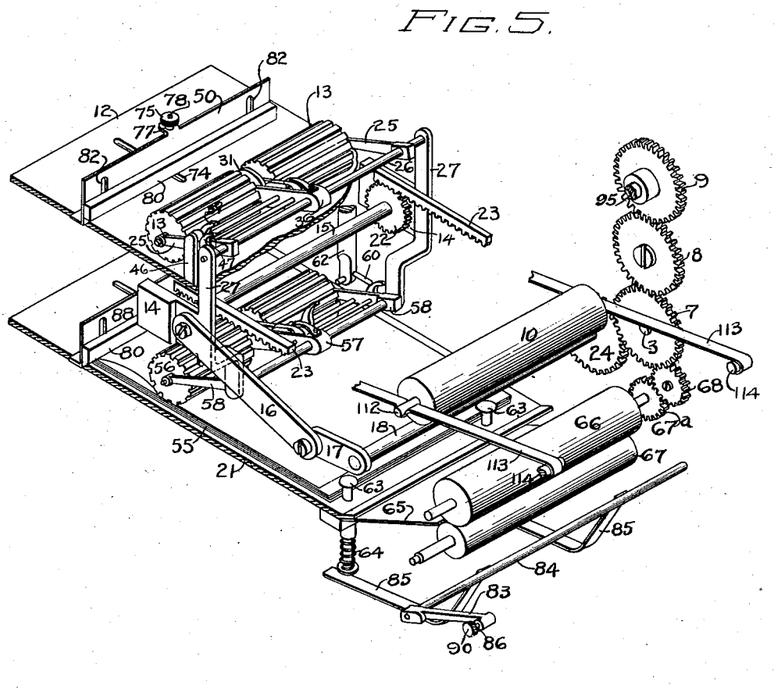
Fig. 5 is a perspective view of the principal operating parts of the machine; their positions being substantially the same as at Fig. 4.
Figure 6:
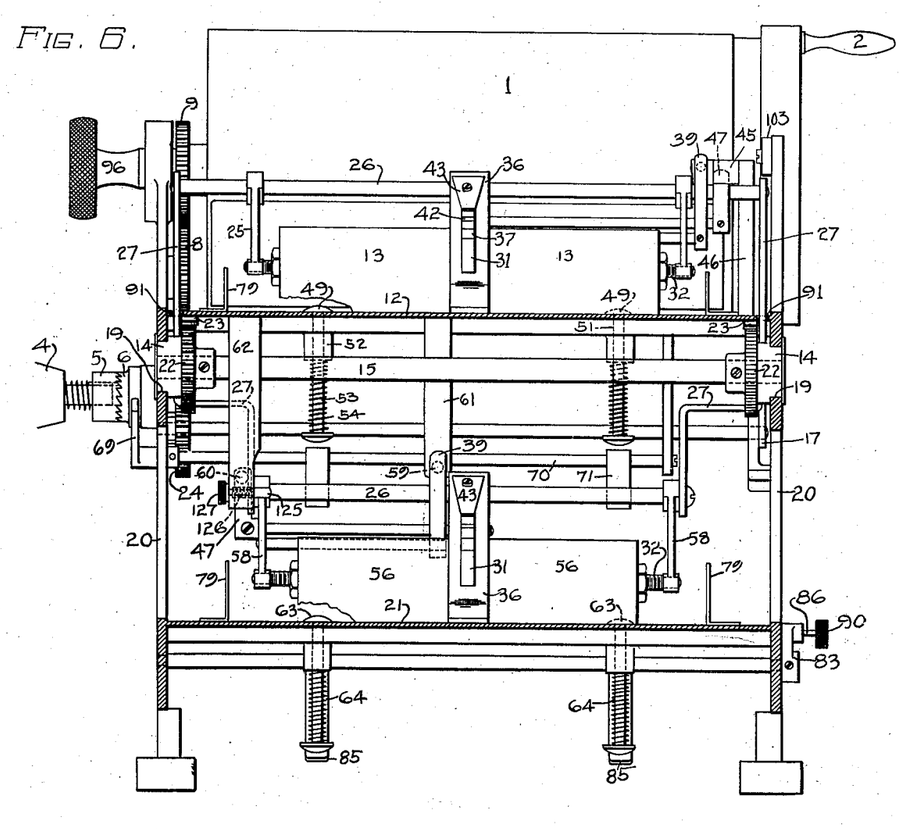
Fig. 6 is a sectional elevation taken about near the left-hand end of Fig. 1.

It will be seen that the gage is formed of sheet metal, and comprises a main vertical plate for the ends of the sheets to rest against, a horizontal flange 73 to rest upon the feed table 12, the latter having a slot 74, and a vertical securing stem 75 passing through said slot and having a head 76 to catch under the table 12, and passing up through said flange 73, and also up through an ear 77 provided on the top of the vertical plate 50; a thumb screw 78 being threaded on said stem above said ear to bind the gage to the table. Gages 79 may also be provided for the side edges of the sheet, and they may be similarly adjusted. A pressure bar 80 rests upon the rear edge of the pile of sheets, being guided by headed pins or screws 81 in vertical slots 82, Fig. 5, provided upon the vertical gage plate 50. This bar 80 holds down the top sheet which is being buckled. It will be understood that the slight buckling of the sheet as it is withdrawn from the clips 49 is an aid in separating the top sheet from the one below it, so that the liability of two sheets being fed simultaneously to the stencil cylinder, is minimized or avoided. After the sheets are placed in position, the handle 69 is swung back to the position at Fig. 1, and the clip 49 drops upon the leading edge of the pile. A handle or lever 83 is depressed from the position at Fig. 4 to the position at Fig. 16 to turn the rock shaft 84, upon which are fixed arms 85, which lift the lower clips 63; a spring pin 86 (Fig. 12) on said arm engaging a hole 87 in the side plate 20 of the framework, to retain the lever and the clips in the position at Fig. 16. A pile of sheets is then laid upon the lower table and the gages 88 and 89 (corresponding to 50 and 79) suitably adjusted. A finger-piece 90 is then pulled out to release the pin 86, whereupon the arm 83 returns to the position at Fig. 1, and the clips 63 drop upon the lower pile of sheets. The machine may then be set in operation, and the sheets fed forwardly to be stenciled and interleaved. The arms 27 extend up through slots 91 in the opposite sides of the upper table 12; and it will be seen that the roller carriage and principal portion of the mechanism is confined between the side plates 20 of the frame. The revolving crank shaft 18 is mounted at one end in a side plate 20, and at the other end in a bracket bar 92, which is secured by screws 93 or otherwise to the other side frame; the crank 17 swinging between said bar 92 and the last-mentioned side frame.

It will be seen at Fig. 11 that the stencil cylinder 1 is provided with a hub 94 in which is inserted a headed stud 95 upon the outer end of which is threaded a knurled nut 96. Said stud has a shoulder 97 against which the hub 98 of the gear 9 is pressed by said nut 96; a sleeve 99 intervening between said hub and said nut, and serving as a journal for the cylinder. A journal box 100 formed upon the side plate 20 of the machine is provided with a cap 101 pivoted at 102 to swing up from the position at Fig. 13 to the position at Fig. 14, thereby releasing the cylinder, this end of which may be lifted to clear the journal box, whereupon the cylinder may be slidden endwise, to release it from the rolls 103, which usually support its other end. The gear 9 of course comes off with the cylinder, being easily disconnected from the gear 8, and easily meshed again therewith upon placing the cylinder back into the machine. The cap 101 is locked down by a pin 104, which passes through a perforation in the journal box 100, and also through a perforation 105 provided in a tongue 106 on the cap, which fits in a recess 107 in the journal box. The pin is pressed in by a lever 108 having a releasing finger piece 109, and actuated by a spring 110; the lever being pivoted upon a stud 111.

The stenciling pressure roll 10 is mounted by an axle 112 upon yielding arms 113, which are hinged at 114 upon the framework at their forward ends, and connected at their rear ends by a bar 115. A cam 116 presses up against the middle of said bar 115, said cam mounted on a rock shaft 117 carrying a pinion 118 in mesh with a sector 119, the latter mounted on a rock shaft 120, which carries outside of the framework a lever or handle 121, which may be held down by a latch 122, as at Fig. 2. Said lever 121 carries a worm 123 which engages a worm wheel 124 fixed on said shaft 120, to vary the pressure of the roll 10 against the stencil cylinder in the usual manner. When it is desired to remove the stencil cylinder, or to ink it, or to adjust the stencil thereon, the latch 122 is released and the roll 10 dropped from the cylinder, as at Fig. 3. The crank 17 and pitman 16 play between the sector 119 and the adjacent side plate 20.

A pin 125 may be used to support the roll frame 57 when it is elevated, for convenience in inserting the pile of sheets on the bottom table 21. The pin is provided with a spring 126 and an abutment 127, whereby it may be withdrawn to permit the roller 56 to drop.

Figures 8, 9:
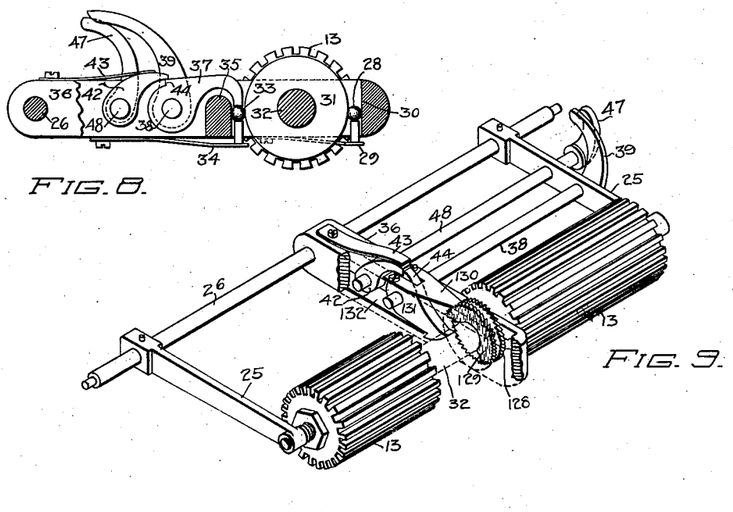
Fig. 8 is a cross sectional elevation of the parts seen at Fig. 7, showing the roll held against rotation in either direction.
Fig. 9 is a view similar to Fig. 7, but showing a pawl and ratchet mechanism for controlling the rotation of the feeding roll in place of the ball clutch mechanism, seen at Fig. 7. At Fig. 9 the roll is shown released to run backwardly freely, from the Fig. 1 position.
Figure 10:
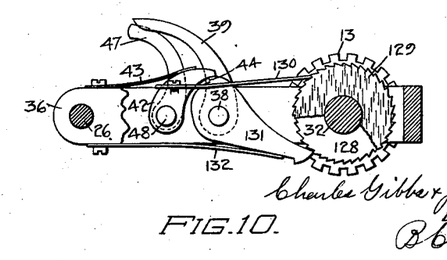
Fig. 10 is a sectional elevation of the Fig. 9 devices, but showing the pressure roll locked against rotation in either direction, so that it may effect the withdrawal and buckling of the top sheet, as at Fig 4.

At Figs. 9 and 10, in place of the roll clutches seen at Figs. 7 and 8, there are employed ratchet wheels 128 and 129, the teeth of one being set oppositely from the teeth of the other. A spring pawl 130 engages the teeth 129, to prevent the feed roller 13 from rotating during its advance stroke. A pawl 131 engages the ratchet wheel 128, being fixed on the rock shaft 38 and controlled by the arm 39 in the same manner as the arm 37. That is, at the completion of the advance stroke of the roller frame, the arm 39 engages the stop 40, and the pawl 131 is turned out of engagement with the ratchet 128, and locked in its released position by the sear 42. The sear is released at a point near the completion of the retreating stroke of the roller frame, and permits the pawl 131 to be snapped up again by a spring 132 into mesh with the ratchet wheel 128 to prevent further rotation of the feed roll 13 during the completion of its retreating stroke.

Other variations may be resorted to within the scope of the invention, and portions of the improvements may be used without others.

Having thus described our invention, we claim:

1. The combination with a stationary sheet-supporting table and a pressure clip for the leading edge of the sheets, said clip movable up and down to accommodate the height of the pile of sheets, of a gage for the rear ends of the sheets, and means movable up and down with the pile to engage the top sheet, means movable up and down with said sheet-engaging means to control the latter at all heights thereof and cause it to withdraw said sheet from the clip and buckle it back against the gage and then to carry said sheet forwardly over the clip, and sheet-advancing mechanism accessible to said sheet at any height at which the sheet may be delivered from the pile.

2. The combination with a stationary sheet-supporting table and an up and down movable pressure-clip to rest upon the leading edge of the pile of sheets, of a gage for the rear edge of the pile, a feeding device to rest upon the pile, and means to reciprocate said feeding device to withdraw the top sheet from the clip and buckle it back against the gage, and then advance said sheet over the clip; said feeding device having a loose connection to said reciprocating means, to enable the former to move up and down to accommodate the height of the pile of sheets, and means mounted upon the stationary framework of the machine and extending to said feeding device to coöperate therewith at all heights at which the latter may be placed, for controlling the sheet-feeding action thereof.

3. The combination with a stationary sheet-supporting table and an up and down movable pressure-clip to rest upon the leading edge of the pile of sheets, of a feeding device to rest upon the pile, controlling means for said sheet-feeding device, means to reciprocate said feeding device along the pile, said feeding device having a loose connection to said reciprocating means, to enable the former to move up and down to accommodate the height of the pile of sheets, said controlling means movable up and down with said feeding device, and said feeding device operative at all heights of the pile of sheets and intermittently effective during its retreating stroke, to move independently of the top sheet during the first part of said retreating stroke, and to withdraw the top sheet from the clip only during the last part of said stroke and to advance the sheet over and beyond said clip during the advance stroke of the feeding device.

4. The combination with a stationary sheet-supporting table, an up and down movable pressure-clip to rest upon the leading edge of the pile of sheets, and a gage for the rear end of the pile, of a roll to run upon the pile, a carriage, means to reciprocate said carriage, a bail or device hinged to the carriage and engaging said roll, to permit the latter to rise or fall while connected to said carriage, and roll-controlling means mounted partly on said bail and comprising members fixed on the framing and effective at the different heights at which said roll runs for withdrawing and advancing the top sheet beyond said clip.

5. The combination with a stationary sheet-supporting table, a clip to rest upon the leading edge of the sheets, and a gage for the rear end of the pile, of a roll to run upon the pile and withdraw and advance the top sheet, means to reciprocate said roll, said roll having a loose connection to said reciprocating means, to enable the roll to move up and down to accommodate the height of the pile of sheets; controlling means movable up and down with said roll and including a device to cause said roll to run independently of the top sheet during the first portion of the retreating stroke of the roll, and thereupon to withdraw the top sheet from the clip and buckle it against the rear gage during only the final portion of the retreating stroke of the roll, and means also movable up and down with said roll to cause the roll in its advancing stroke to advance the released sheet over the top of the clip.

6. The combination with a stationary sheet-supporting table and a clip to rest upon the leading edge of the pile of sheets, of a roll to run upon the pile, a carriage, means to reciprocate the carriage, a bail or hinged frame to connect the roll to the carriage to enable the roll to move up and down to accommodate the height of the pile of sheets, roll-controlling means connected to said bail and movable up and down therewith to cause the roll to run freely independently of or over the top sheet during the first portion of its retreating stroke and thereupon to withdraw the top sheet from the clip only during the last portion of said stroke, and means also connected to said bail to cause the roll in its advancing stroke to advance the released sheet over the top of the clip.

7. The combination with a stationary sheet-supporting table and a feeding roll to run upon the pile of sheets, of a carriage, means to reciprocate the carriage, a hinged frame connecting the roll to the carriage to enable the roll to move up and down to accommodate the height of the pile of sheets, and a roll-controlling clutch mechanism upon said frame and connected to said roll to cause the latter to run freely over the top sheet independently thereof during the first part of its retreating stroke, and thereupon to cause said roll to carry back the top sheet only during the final part of said stroke and to advance said sheet during the advance stroke of the roll.

8. The combination with a stationary sheet-supporting table and a feeding roll to run upon the pile of sheets, of a reciprocating driver, a hinged frame or member connecting said roll to said driver, a clutch upon said frame capable of preventing the roll from turning during its retreating stroke, means upon the framework effective to release said clutch at about the beginning of said retreating stroke, means upon the framework effective to close said clutch before the termination of its retreating stroke, a gage or stop against which the top sheet is buckled by the roll in making the final portion of its retreating stroke, and a clutch upon said frame to prevent the roll from turning during its advancing stroke.

9. The combination with a stationary sheet-supporting table and a feeding roll to run upon the pile of sheets, of a reciprocating driver, a hinged frame or member connecting said roll to said driver, a clutch upon said frame capable of preventing the roll from turning during its retreating stroke, means upon the framework effective to release said clutch at about the beginning of said retreating stroke, means upon the framework effective to close said clutch before the termination of its retreating stroke, a gage or stop against which the top sheet is buckled by the roll in making the final portion of its retreating stroke, a clutch upon said frame to prevent the roll from turning during its advancing stroke, and a clip for the leading edge of the pile of sheets; said clip movable up and down to accommodate the height of the pile of sheets, and said clutch-closing device being constructed to cause the roll to withdraw the top sheet from said clip during the final portion of the retreating stroke of the roll, and the roll being effective during its advance stroke to advance said top sheet over said clip.

10. The combination with a stationary sheet-supporting table and a clip for the leading edge of a pile of sheets, of a feeding roll to run upon the pile, a reciprocating frame carrying said roll, said frame movable up and down with said roll to accommodate the height of the pile of sheets, a clutch on said frame and movable up and down therewith to prevent the roll from turning during its retreating stroke, a clutch-releasing device comprising a part upon the framework of the machine, means including fixed devices and dependent upon the travel of said frame to cause said releasing device to be effective during the first part of the retreating stroke of the roll and ineffective during the last part of said stroke, and a clutch device also on said frame to prevent the roll from turning during its advance stroke.

11. The combination with a clip for the leading edge of a pile of sheets, of a friction roll to run upon the pile, a reciprocating frame in which said roll is mounted, a clutch on said frame to prevent the roll from turning during its retreating stroke, a clutch-releasing device on said frame and having an arm to engage a fixed abutment to release the roll during the first part of its retreating stroke; a latch or sear to hold said releasing device in effective position, an arm connected to said latch or sear to engage a fixed abutment to cause said releasing device to return to normal ineffective position during the final portion of the retreating stroke of the roll, and a clutch device on said frame to prevent the roll from turning during its advance stroke.

12. The combination with a clip for the leading edge of a pile of sheets, of a frictional feed-roll to run upon the pile, a wheel connected to said feed-roll, a reciprocating frame carrying said feed-roll and wheel, a ball or roller supported on said frame to clutch said wheel, a spring to hold the ball against the wheel to prevent the feed-roll from turning during the retreating stroke of said frame, a lever on said frame, an arm on said lever to engage a fixed abutment to cause the arm to press the ball away from the wheel, a latch on said frame to detain said arm in ball-releasing position, a fixed abutment to be engaged by an arm of said latch to release the ball-releasing arm and permit the ball to clutch the wheel, and a second spring-pressed ball supported on said frame to engage said wheel to prevent the feed-roll from turning during the advance stroke of said frame.

13. The combination of a gage for the rear edge of a pile of sheets, a pressure bar to rest upon the rear end of the pile, means to buckle the top sheet back against the gage and then advance it to a sheet-advancing mechanism, said gage formed of sheet metal and comprising a vertical plate for the ends of the sheets to rest against, a horizontal flange to rest upon the feed table, the latter having a slot, a vertical securing stem in said slot and having a head to catch under the table and passing up through said flange and also up through an ear provided on the top of said vertical plate, and a thumb screw upon said stem above said ear.

14. In a sheet-feeding machine, the combination with a pair of clips, each comprising a stem having a head to catch upon the sheets, and each having a spring to pull it down, of a rock shaft having a finger piece, and arms or cams extending from said rock shaft to the lower ends of said clips to raise the same.

15. In a sheet-feeding machine, the combination with a pair of clips, each comprising a stem having a head to catch upon the sheets, and each having a spring to pull it down, of a rock shaft having a finger piece, and arms or cams extending from said rock shaft to the lower ends of said clips to raise the same and constructed to lock them in elevated positions.

16. The combination with a framework and a stencil cylinder detachably mounted upon the framework, of a revolving crank mounted upon the framework, a paper feeding device reciprocated by said crank, and a train of gearing between said crank and said cylinder including a gear mounted upon the cylinder to be detached therewith.

17. The combination with a framework and a stencil cylinder mounted upon the framework, of a revolving crank mounted upon the framework, a paper feeding device reciprocated by said crank, a train of gearing between said crank and said cylinder, and a primary power shaft carrying one member of said train of gearing between the cylinder-gear and the crank, said cylinder gear mounted upon the cylinder to be detached therewith.

18. The combination with a stencil cylinder and a framework upon which it is mounted, said framework comprising a pair of side plates connected together, of a crank connected by a train of gearing to said stencil cylinder, a carriage connected by a pitman to said crank, said crank, pitman and gearing between said side plates, said carriage extending between said side plates and having arms extending up between said side plates, a fixed paper-feeding table between said arms, and a paper-feeding roller connected to said arms to be reciprocated thereby upon the pile of sheets.

19. The combination with a stencil cylinder and a framework upon which it is mounted, said framework comprising a pair of side plates connected together, of a crank connected by a train of gearing to said stencil cylinder, a carriage connected by a pitman to said crank, said crank, pitman and gearing between said side plates, said carriage extending between said side plates and having arms extending up between said side plates, a fixed paper-feeding table between said arms, a paper-feeding roller connected to said arms to be reciprocated thereby upon the pile of sheets, arms depending from said carriage, and a second paper-feeding roller connected to said depending arms to run upon a second pile of sheets.

20. The combination with a stencil cylinder and a framework upon which it is detachably mounted, said frame-work comprising a pair of side plates connected together, of a revolving crank connected by a train of gearing to said stencil cylinder, said train of gearing including a gear mounted upon the cylinder to be detached therewith, a primary power shaft carrying one member of said train of gearing between said cylinder gear and said crank, a carriage connected by a pitman to said crank, the gearing, crank, pitman and carriage being mounted between said side plates, and a paper-feeding roller connected to said carriage.

21. The combination with a stencil cylinder and a framework upon which it is detachably mounted, said framework comprising a pair of side plates connected together, of a revolving crank connected by a train of gearing to said stencil cylinder, said train of gearing including a gear mounted upon the cylinder to be detached therewith, a primary power shaft carrying one member of said train of gearing between said cylinder gear and said crank, a carriage connected by a pitman to said crank, the gearing, crank, pitman and carriage being mounted between said side plates, said carriage having arms extending up between said side plates, a stationary paper-feeding table between said arms, and a paper-feeding roller connected to said arms to be reciprocated thereby upon a pile of sheets.

22. The combination with a stencil cylinder and a framework upon which it is detachably mounted, said framework comprising a pair of side plates connected together, of a revolving crank connected by a train of gearing to said stencil cylinder, said train of gearing including a gear mounted upon the cylinder to be detached therewith, a primary power shaft carrying one member of said train of gearing between said cylinder gear and said crank, a carriage connected by a pitman to said crank, the gearing, crank, pitman and carriage being mounted between said side plates, said carriage having arms extending up between said side plates, a stationary paper-feeding table between said arms, and a paper-feeding roller connected to said arms to be reciprocated thereby upon a pile of sheets, arms depending from said carriage, and a second paper feeding roller connected to said depending arms to run upon a second pile of sheets.

23. The combination with a stencil cylinder, of a revolving crank, a train of gearing between said cylinder and said crank, a plurality of paper-feeding mechanisms reciprocated by said crank to feed sheets to said cylinder to be stenciled upon and also to feed interleaving sheets, and a pair of rolls to which the interleaving sheets are advanced, one of said rolls geared to a member of said train of gearing.

CHARLES GIBBS.
JACOB SOKOLOV.

Witnesses:
KITTIE FRANKFORT,
JOHN O. SEIFERT.